United States Patent [19]

Suzuki et al.

[11] Patent Number: 4,999,668
[45] Date of Patent: Mar. 12, 1991

[54] EXPOSURE CONTROL METHOD FOR PHOTOGRAPHIC PRINTER

[75] Inventors: Kenji Suzuki; Hiroaki Nakamura, both of Kanagawa, Japan

[73] Assignee: Fuji Photo Film Co., Ltd., Tokyo, Japan

[21] Appl. No.: 500,990

[22] Filed: Mar. 29, 1990

[30] Foreign Application Priority Data

| Mar. 29, 1989 [JP] | Japan | 1-77887 |
| Sep. 11, 1989 [JP] | Japan | 1-235397 |
| Mar. 5, 1990 [JP] | Japan | 2-53458 |

[51] Int. Cl.⁵ .................................. G03B 27/78
[52] U.S. Cl. ............................ 355/38; 355/77
[58] Field of Search .................... 355/38, 68, 77

[56] References Cited

U.S. PATENT DOCUMENTS

| 3,697,174 | 10/1972 | McCune | 355/38 |
| 4,154,523 | 5/1979 | Rising et al. | 355/38 |
| 4,159,174 | 6/1979 | Rising | 355/38 |
| 4,344,708 | 8/1982 | Tokuda | 355/35 X |
| 4,610,538 | 9/1986 | Takenaka | 355/77 X |
| 4,707,118 | 11/1987 | Terashita | 355/38 |
| 4,736,244 | 4/1988 | Shiota et al. | 355/38 |
| 4,782,390 | 11/1988 | Hayashi et al. | 355/38 X |
| 4,939,537 | 7/1990 | Masuda et al. | 355/35 |

Primary Examiner—A. A. Mathews
Assistant Examiner—D. Rutledge
Attorney, Agent, or Firm—Sughrue, Mion, Zinn Macpeak and Seas

[57] ABSTRACT

An image frame to be printed is subjected to three color separation and photometry by using three light receiving devices. In order to cancel a photometry error caused by the sensitivity crosstalk of each light receiving device, the measured light amount of each color is subjected to a matrix calculation. The corrected measured light amount by this matrix calculation is converted logarithmically into a measured density. In order to provide a linear relationship between the color correction filter setting position and the measured density, the measured density is converted in a virtual measured density in the linear area. The virtual measured density is corrected by a 3×3 matrix calculation to cancel a photometry error caused by unwanted absorption of color correction filters.

11 Claims, 5 Drawing Sheets

EXPOSURE CONTROL METHOD FOR PHOTOGRAPHIC PRINTER

BACKGROUND OF THE INVENTION

The present invention relates to an exposure control method for use with a photographic printer, and more particularly to an exposure control method capable of determining with high precision the setting positions of color correction filters for adjusting color or density.

For a photographic printer of the light adjustment type where three color components of a printing light are adjusted cyan, magenta and yellow color correction filters are disposed between a light source and a negative film. The printing light, of whose three color components the ratio and intensity have been adjusted by these color correction filters, is mixed and applied to an image frame (negative image) set at a printing stage. This image frame then is projected upon a color paper while the shutter is open.

With a conventional open-type photometry and light adjustment method, the three color correction filters are set at predetermined positions and each color of an image frame to be printed is measured with a corresponding light receiving device. The measured density (strictly speaking, a logarithmic value of the light amount) of each color and, if necessary, manually inputted correction data are used to calculate the logarithmic values of exposure light amount for red, green and blue colors. The relationship between the setting positions of the color correction filters, each represented by the number of drive pulses from a pulse motor and the logarithmic values of light amount, is previously stored in a memory as a calibration curve for each color. By referring to the calibration curve, the setting position of each color correction filter can be obtained from the logarithmic value of exposure light amount. The color correction filters then are set at the determined setting positions by driving the pulse motor.

A calibration curve obtained by setting the three color correction filters at the same filter setting position differs from a calibration curve obtained by using the three color correction filters sequentially and separately. The reason for this is that if the three color correction filters are inserted in the printing optical path at the same time, unwanted absorption occurs in those filters. The calibration curve used with the conventional open-type photometry and light adjustment method is formed by using the three color correction filters at the same time. Therefore, although proper color adjustment can be obtained for an image frame having a proper color balance that allows setting the three color correction filters at the same position, proper exposure control cannot be obtained for most of the actual image frames to be printed, since they have unbalanced color.

The above problems can be solved by using feedback control. Specifically, by using as a target value the logarithmic value of calculated exposure light amount for each color, and as an actual measured light value the logarithmic value of light amount measured by inserting each color correction filter into the printing optical path, the position of the color correction filter may be adjusted so as to make the actual measured light value coincident with the target value. However, this feedback control requires a DC servo motor in a drive unit of the color correction filter. A brushless DC servo motor is expensive a brush type DC servo motor is not satisfactorily durable.

In addition to the photometry error caused by unwanted absorption by association of color correction filters, there is another photometry error which depends upon a photometry precision of light receiving devices for measuring an image frame to be printed. For instance, a blue color light receiving device for measuring a blue color has sensitivity not only to essential blue color but also to red color, although the sensitivity to the latter is relatively small. Therefore, it is difficult to measure correctly the blue color component transmitted through an image frame. The sensitivity for a color other than an essential color will be referred to as "sensitivity crosstalk".

SUMMARY OF THE INVENTION

Therefore, it is a principal object of the invention to provide an exposure control method for a photographic printer capable of high precision exposure control by reducing unwanted absorption by color correction filters without performing feedback control which leads to problems of cost and durability.

It is another object of the invention to provide an exposure control method for a photographic printer capable of high precision exposure control by reducing an amount of photometry error caused by sensitivity crosstalk of a light receiving device.

It is a further object of the present to provide an exposure control method for a photographic printer capable of readily determining the setting position of a color correction filter while eliminating unwanted absorption of color correction filters and sensitivity crosstalk of a light receiving device.

In order to achieve the above and other objects and advantages of this invention, there is provided an exposure control method for a photographic printer wherein the measured densities of three primary colors obtained by measuring an image frame to be printed are subjected to matrix calculation to determine the filter setting position for one color while considering the measured densities of all the three colors.

Representing the filter setting positions as $FP_C$, $FP_M$ and $FP_Y$ (where C is for cyan, M is for magenta, and Y is for yellow), the following equation, for example, is used in the matrix calculation:

$$\begin{bmatrix} FP_C \\ FP_M \\ FP_Y \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} \Delta D_R + B_R \\ \Delta D_G + B_G \\ \Delta D_B + B_B \end{bmatrix} + \begin{bmatrix} \delta_R \\ \delta_G \\ \delta_B \end{bmatrix}$$

The symbols used in the matrix have the following meanings.

$\Delta D_R$, $\Delta D_G$ and $\Delta D_B$:

R is for red, G is for green, and B is for blue. Representing the measured density for a normal control negative film as $DN_i$ (i being one of red, green and blue), the measured density of an image frame to be printed as $D_i$, and the density difference $(DN_i - D_i)$ as $\Delta d_i$, then they represent a virtual measured density difference which is a subtraction of a virtual density $VD_i$ obtained by converting the density $(DN_i + \Delta d_i)$ into the linear area, from a virtual measured density $VDN_i$ obtained by converting the measured density $DN_i$ into the linear area.

$a_{11}$ to $a_{33}$ matrix elements (coefficients). The coefficients for a color (object color) to be calculated usually take a value of 1 to 1.5, and the coefficients for the other two colors used for the calculation usually take a value of $\pm 1 \times 10^{-4}$ to $\pm 2 \times 10^{-1}$. $B_R$, $B_G$ and $B_B$: virtual measured densities corresponding to the filter setting positions for a properly finished normal control negative film.

$\delta_R$, $\delta_G$ and $\delta_B$: matrix elements (correction constants), preferably having a value of 0 to $\pm 2 \times 10^{-1}$.

According to another preferred embodiment, the measured light values (light quantities) for three primary colors obtained by measuring an image frame to be printed are subjected to the following matrix calculation, so as to cancel the sensitivity crosstalk of a light receiving device. The measured light values after subjected to this matrix calculation are converted logarithmically into the measured densities. The measured light values after correction ar substituted into the first-mentioned matrix equation so as to cancel the unwanted filter absorption and thereafter calculate the filter setting positions.

$$\begin{bmatrix} V_R' \\ V_G' \\ V_B' \end{bmatrix} = \begin{bmatrix} b_{11} & b_{12} & b_{13} \\ b_{21} & b_{22} & b_{23} \\ b_{31} & b_{32} & b_{33} \end{bmatrix} \times \begin{bmatrix} V_R \\ V_G \\ V_B \end{bmatrix} + \begin{bmatrix} \beta_R \\ \beta_G \\ \beta_B \end{bmatrix}$$

The symbols in the matrix have the following meanings.
$V_R$, $V_G$ and $V_B$: measured light values of three primary colors.

$V_R'$, $V_G'$ and $V_b'$: measured light values after matrix calculation.

$b_{11}$ to $b_{33}$, $\beta_R$, $\beta_G$ and $\beta_b$: matrix elements for cancelling the sensitivity crosstalk of light receiving devices, preferably taking a value 1 for an object color, and a value of $\pm 1 \times 10$ to $\pm 2 \times 10^{-1}$ for the two other colors. The correction constants take a value of 0 to $\pm 2 \times 10^{-1}$.

According to another preferred embodiment, the results of the matrix calculation are used as table data which are stored in a look-up table. In determining the filter setting positions, using the measured light values or density values, the filter setting positions of three colors are searched directly from the look-up table.

In the invention, the measured density is converted into the virtual measured density in the linear area so as to obtain a linear relationship between the filter setting position and the measured density (measured gain value). The converted virtual measured densities are corrected by using the $3 \times 3$ matrix calculation. With the matrix calculation using the virtual measured densities, it is possible to perform exposure control with substantially the same precision as with feedback control, even for an image frame having unbalanced color which requires the three color correction filters to be set at different positions. Accordingly, high precision exposure control which is not obtained by a conventional open-type photometry and light adjustment method can be realized without using a feedback control system. The invention also solves the problem of cost and durability caused by a use of a feedback control system using a servo motor.

Further, the measured light values are subjected to matrix calculation in order to cancel the photometry error caused by sensitivity crosstalk of light receiving devices. The calculated values are converted logarithmically into the measured densities, which are converted further into the virtual measured densities and are subjected to matrix calculation. Therefore, the sensitivity crosstalk of light receiving devices and the color filter unwanted absorption are cancelled so as to reduce the photometry error and provide higher precision exposure control.

Furthermore, by storing the matrix calculation results in a look-up table as its table data, it is possible to determine the filter setting position quickly.

BRIEF DESCRIPTION OF THE DRAWINGS

The above and other objects and advantages of the invention will become apparent from the following detailed description when read in connection with the accompanying drawings, in which.

DETAILED DESCRIPTION OF THE PREFERRED EMBODIMENT

Figure 1:
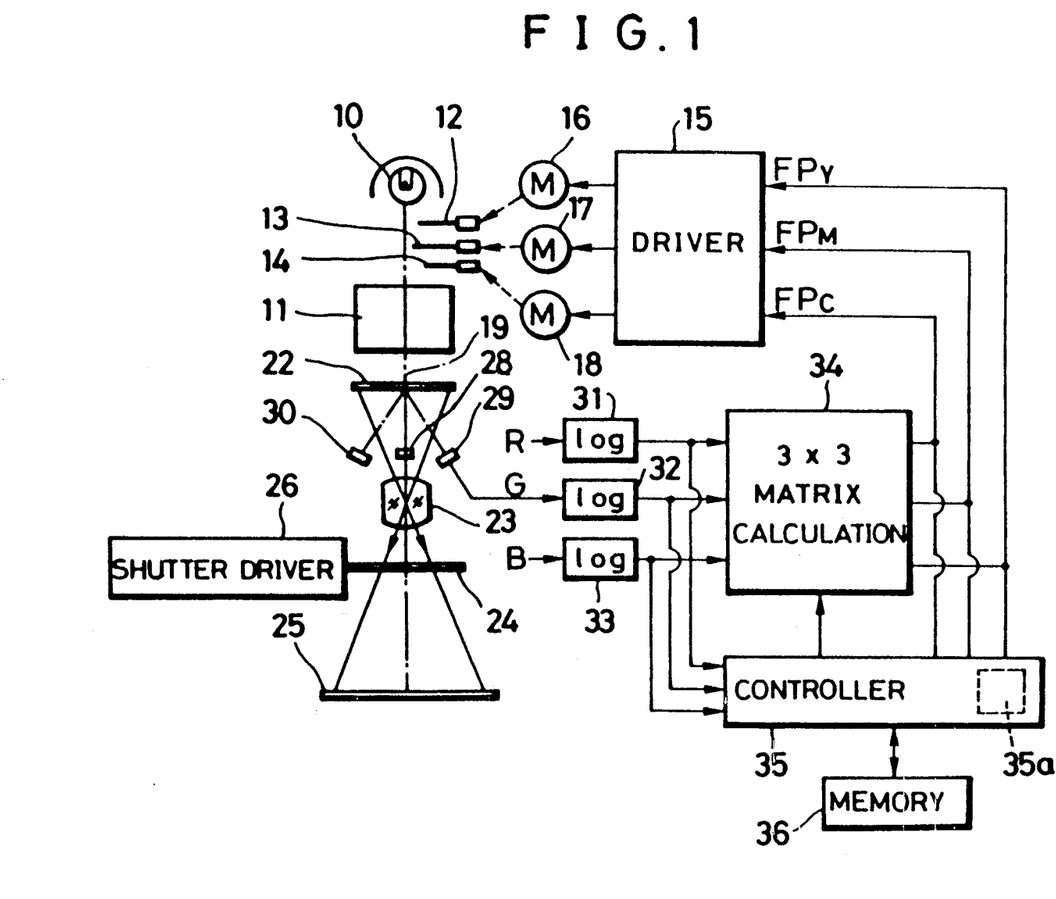
FIG. 1 is a schematic diagram, partially in block form, of an example of a photographic printer for practicing the invention.

Referring to FIG. 1, a yellow filter 12, a magenta filter 13, and a cyan filter 14 are disposed between a light source 10 for radiating white light and a mirror tunnel 11. These color correction filters 12 to 14 are driven by pulse motors 16 to 18 connected to a driver 15 to control the amount of insertion of the filters into a printing optical path 19.

The printing light, sufficiently mixed at the mirror tunnel 11, illuminates a negative film 22 from the back side thereof. The printing light transmitted through the negative film 22 is applied via a printing lens 23 to a color paper 25 while a shutter 24 is open, so as to expose and print the image frame. A shutter drive unit 26, which is constructed of solenoid or motor, opens and closes the shutter 24.

The average transmittance density, e.g., large area transmittance density (LATD), of an image frame is measured for each color by a red color light receiving device 28, a green color light receiving device 29, and a blue color light receiving device 30, each of which is constructed of a color filter and a light receiving element. The light within the wavelength range selected by the color filter is converted photoelectrically into an electric signal. The signals outputted from the light receiving devices 28 to 30 are converted logarithmically, in logarithmic converters 31 to 33, into measured densities (strictly speaking, logarithmic values of light quantities) which then are sent to a matrix calculation circuit 34.

The matrix calculation circuit 34 executes the following equation (1) for each image frame, and the obtained filter setting position is sent to the driver 15 so as to adjust the corresponding filter setting position $FP_j$ (where j is one of C for cyan, M for magenta, and Y for yellow).

$$\begin{bmatrix} FP_C \\ FP_M \\ FP_Y \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} \Delta D_R + B_R \\ \Delta D_G + B_G \\ \Delta D_B + B_B \end{bmatrix} + \begin{bmatrix} \delta_R \\ \delta_G \\ \delta_B \end{bmatrix} \quad (1)$$

The symbols used in the matrix have the following meanings.

$\Delta D_R$, $\Delta D_G$ and $\Delta D_B$:

R is for red, G is for green, and B is for blue. Representing the measured density for a normal control negative film as $DN_i$ (i representing one of red, green, and blue), the measured density of an image frame to be printed as $D_i$, and the density difference $(DN_i - D_i)$ as $\Delta d_i$, then they represent a virtual measured density difference which is a subtraction of a virtual density $VD_i$, obtained by converting the density $(DN_i + \Delta d_i)$ into the linear area, from a virtual measured density $VDN_i$ obtained by converting the measured density $DN_i$ into the linear area.

$a_{11}$ to $a_{33}$: matrix elements (coefficients) obtained through regression analysis.

$B_R$, $B_G$ and $B_B$: virtual measured densities corresponding to the filter setting positions for a properly finished normal control negative film.

$\delta_R$, $\delta_G$ and $\delta_B$: matrix elements (correction constants) obtained through regression analysis.

In setting the matrix elements, a controller 35 fetches the measured density signals outputted from the logarithmic converters 31 to 33 while changing the setting positions of the color correction filters 12 to 14. A calibration curve is formed based on the measured density signals and the filter setting positions. An arithmetic operation unit 35a determines $a_{11}$ to $a_{33}$ and $\delta_R$, $\delta_G$ and $\delta_B$ using regression analysis. A memory 36 stores programs for regression analysis, the exposure light amount calculation equation and the like, and other necessary data. In regression analysis, as shown in the Table below, an image frame is measured while using various setting positions of the color correction filters 12 to 14, and a straight line which minimizes the average of absolute values of calculated difference values obtained by using respective measured light values and the matrix, i.e., which minimizes the average distance. Instead of regression analysis, a fuzzy computer having neural networks may be used to determine the elements of the matrix.

| Setting Positions (Drive Pulse Numbers) | | | | | | | |
|---|---|---|---|---|---|---|---|
| C | 800 | 800 | 0 | 0 | 800 | 800 | 400 | ... |
| M | 800 | 0 | 800 | 0 | 800 | 0 | 0 | ... |
| Y | 800 | 0 | 0 | 800 | 0 | 800 | 0 | ... |

The matrix elements determined as above take a value of 1 to 1.5 for a color (object color) to be calculated in determining the filter setting position, a value of $\pm 1 \times 10$ to $\pm 2 \times 10^{-1}$ for the other two colors, and a value of 0 to $\pm 2 \times 10^{-1}$ for the correction constants $\delta_R$, $\delta_G$ and $\delta_B$. A preferable example thereof is shown below.

$$\begin{bmatrix} a_{11} & a_{12} & a_{13} \\ a_{21} & a_{22} & a_{23} \\ a_{31} & a_{32} & a_{33} \end{bmatrix} =$$

$$\begin{bmatrix} 1.01 & -7.71 \times 10^{-3} & 5.94 \times 10^{-4} \\ -1.86 \times 10^{-1} & 1.22 & -2.43 \times 10^{-2} \\ 6.40 \times 10^{-3} & -1.62 \times 10^{-1} & 1.22 \end{bmatrix}$$

$$\begin{bmatrix} \delta_R \\ \delta_G \\ \delta_B \end{bmatrix} = \begin{bmatrix} 5.76 \times 10^{-2} \\ 2.75 \times 10^{-2} \\ 9.04 \times 10^{-2} \end{bmatrix}$$

Figure 2:
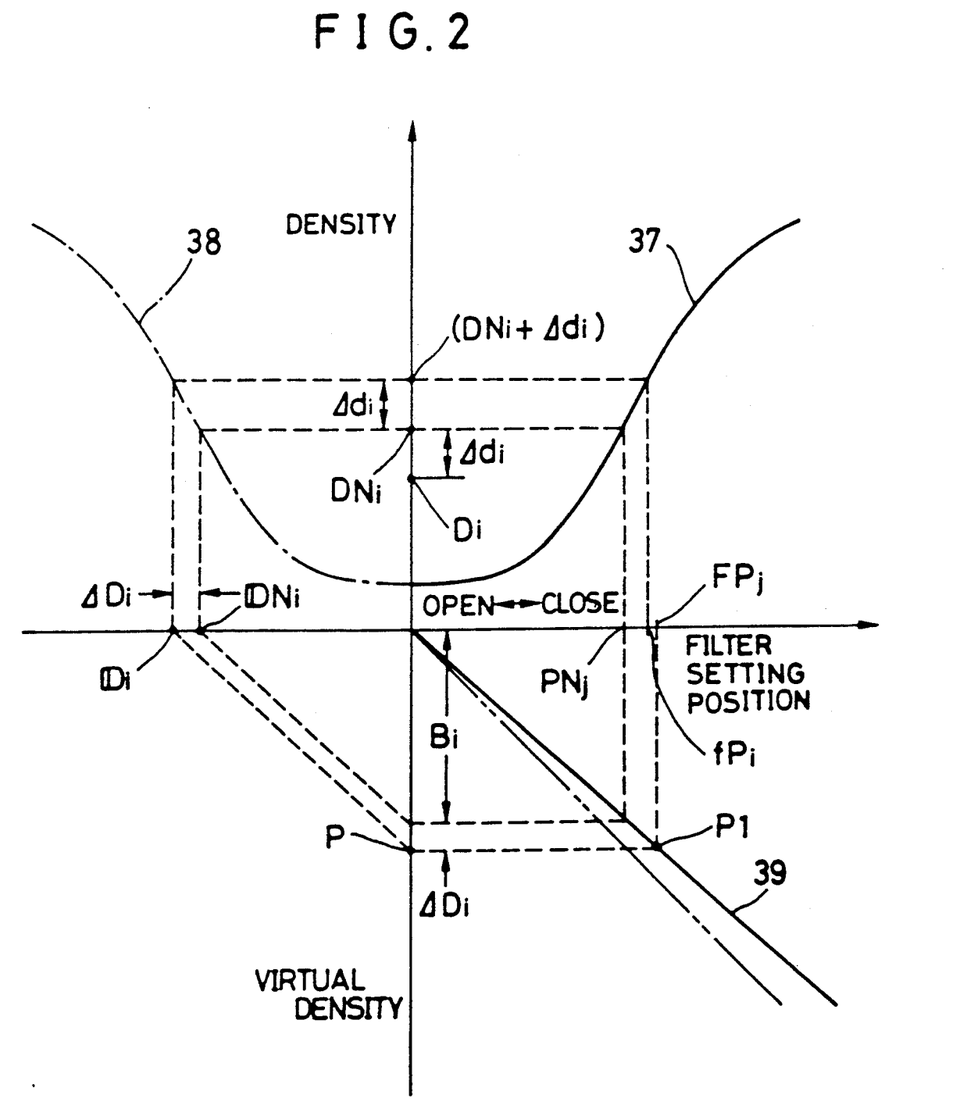
FIG. 2 is a graph illustrating how the filter setting position is calculated.

FIG. 2 is a graph illustrating how a filter setting position is calculated. A calibration curve 37 shows the relationship between the filter setting position and the measured density (measured gain value) when the three color correction filters are inserted into the printing optical path 19 at the same time. That is, the three color correction filters are set at the same position, and one of the three colors transmitted through the normal control negative film is measured and plotted in the graph. $DN_i$ represents a measured density of the normal control negative film when the three color correction filters 12 to 14 are set at the light measuring position, $D_i$ represents the measured density of an image frame to be printed when the three color correction filters 12 to 14 are set at the light measuring position, and $\Delta d_i$ represents a difference therebetween.

A curve 38 is a curve symmetrical to the calibration curve 37 relative to the vertical axis (Y axis). The measured density difference $\Delta d_i$ on the curve 38 is projected onto the horizontal axis (X axis) to obtain the virtual measured density difference $\Delta D_i$ converted into the linear area. That is, the virtual measured density difference $\Delta D_i$ is equal to the virtual measured density $VD_i$, obtained by linearly converting the density $(DN_i + \Delta d_i)$, subtracted from the virtual measured density $VDN_i$ obtained by linearly converting the measured density $DN_i$ of the normal control negative film.

With the balance value $B_i$, the point P at the virtual measured density $(\Delta D_i + B_i)$ is obtained. The equation (1) is used to obtain the X coordinate value of a point P1 where a line parallel to the X axis and passing the point P intersects with a straight line 39. The X coordinate value of the point P1 is $FP_j$. The straight line having a slope of 45 degrees shown by a two-dot-chain line represents a unit matrix for the matrix of the equation (1).

Reference symbol $fP_j$ represents a filter setting position when the three color correction filters are set at the same position. An image frame having a proper color balance is set at this position $fP_j$. An image frame having unbalanced color is set at the filter setting position $FP_j$ to attain a high precision exposure control. $PN_j$ represents the filter setting position for the normal control negative film.

Next, the operation of the above-described embodiment will be described briefly. In determining the elements of the matrix, the controller 35 causes the light receiving devices 28 to 30 to measure the three color components of the printing light transmitted through the normal control negative film while inserting the three color correction filters 12 to 14 to the same degree into the printing optical path 19. The output signals from the light receiving devices 28 to 30 are converted into the measured densities at the logarithmic converters 31 to 33 and are sent to the controller 35. The controller 35 then forms a filter calibration curve, as shown in FIG. 2, for each color, that curve indicating the relationship between the filter setting position and the measured density. The three obtained calibration curves are written into the memory 36.

After forming the calibration curves, the normal control negative films are measured while changing the positions of the three color correction filters. The filter setting positions and measured densities are written into the memory 36. After this measurement, a number of the measured data are used in the arithmetic operation unit 35 a to determine the elements of the matrix, using regression analysis or neural networks.

The measured density when the three color correction filters 12 to 14 are set at the light measuring position is sent to the controller 35 as the measured density $DN_i$ of the normal control negative film. Next, the measured density $DN_i$ on the calibration curve is projected to the X axis to obtain a linearly converted virtual measured density $VDN_i$ which then is stored in the memory 36. Then, the normal control negative film is printed for a test while changing the balance value $B_i$ so as to determine the balance value $B_i$ suitable for obtaining the same quality as that of the reference print.

After determining the elements of the matrix including the balance value $B_i$, an actual image frame is printed. In this case a negative film is set at the printing stage, and the color correction filters 12 to 14 are set at predetermined light measuring positions. The printing light radiated from the light source 10 is transmitted through respective areas of the color correction filters 12 to 14, enters the mirror tunnel 11 to be diffused sufficiently, and illuminates the negative film 22. A part of the printing light transmitted through the image frame of the negative film 22 is measured by the light receiving devices 28 to 30.

The measured densities $D_1$ of the image frame of the negative film 22 are sent to the 3×3 matrix calculation circuit 34 so as to calculate the density $(DN_i+\Delta d_i)$ by using the measured density $DN_i$ of the normal control negative film. The density $(DN_i+\Delta d_i)$ is converted into the linear virtual measured density $VD_i$. On the other hand, the virtual measured density difference can be obtained by subtracting the virtual measured density $VD_i$ from the previously measured virtual density $VDN_i$ of the normal control negative film. Next the virtual measured density difference $\Delta D_i$, balance value $B_i$ and $\delta_i$ are substituted into the matrix equation (1) to calculate the filter setting position $FP_j$. This filter setting position $FP_j$ then is sent to the driver 15 to drive the pulse motors 16 to 18 and insert the color correction filters 12 to 14 into the printing optical path 19. After setting the color correction filters 12 to 14, the shutter 24 is opened for a predetermined time to expose and print the image frame of the negative film 22 onto a color paper 25. If a manual exposure correction amount is entered from a keyboard in a well-known manner, the entered manual correction amount for each color is added to the matrix calculation equation (1).

Figure 3:
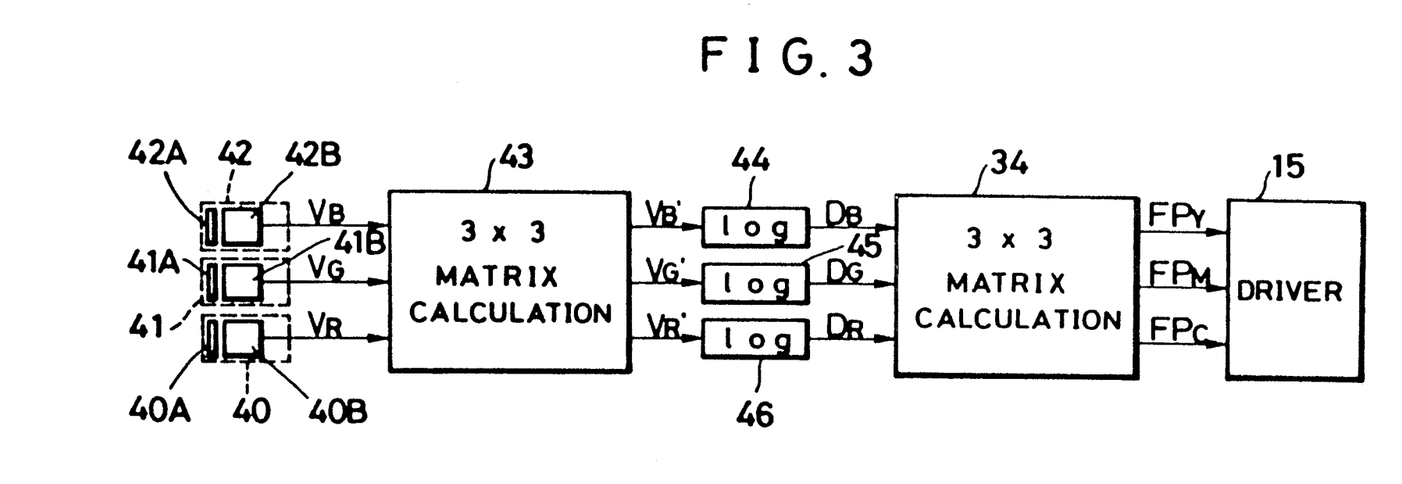
FIG. 3 is a block diagram illustrating the function of matrix calculation of signals from light receiving devices.

Next another embodiment for cancelling the sensitivity crosstalk of a light receiving device will be described for the case in which a light receiving device for measuring an image frame to be printed has sensitivity crosstalk, e.g., for the case in which a blue light receiving device also has a sensitivity for red. In this embodiment, as shown in FIG. 3, prior to logarithmically converting three color measured values $V_R$, $V_G$ and $V_B$ from the red, green and blue light receiving devices 40, 41 and 42 into the measured densities, the calculation by the following equation (2) is executed at the 3×3 matrix calculation unit 43 so as to cancel the sensitivity crosstalk of the light receiving devices 40 to 42. The light receiving devices 40 to 42 are constructed of color filters 40A, 41A and 42A and light receiving elements 40B, 41B and 42B, so that the light within the wavelength range selected by the color filters are converted photoelectrically into electric signals.

$$\begin{bmatrix} V_R' \\ V_G' \\ V_B' \end{bmatrix} = \begin{bmatrix} b_{11} & b_{12} & b_{13} \\ b_{21} & b_{22} & b_{23} \\ b_{31} & b_{32} & b_{33} \end{bmatrix} \times \begin{bmatrix} V_R \\ V_G \\ V_B \end{bmatrix} + \begin{bmatrix} \beta_R \\ \beta_G \\ \beta_B \end{bmatrix} \quad (2)$$

wherein $b_{11}$ to $b_{33}$, and $\beta_4$, $\beta_G$ and $\beta_B$ are elements of the matrix for cancelling the sensitivity crosstalk of the light receiving devices. These elements can be obtained using regression analysis or neural networks on the basis of the simulation results of the light receiving device outputs relative to the incident lights using the spectral sensitivity data of the light receiving devices and the spectral transmission data of the color filters. The coefficients of the matrix take a value 1 for an object color, and a value of $\pm 1 \times 10^{-4}$ to $\pm 2 \times 10^{-1}$ for the other two colors. The correction constants $\beta_R$, $\beta_G$ and $\beta_B$ take a value of 0 to $\pm 2 \times 10^{-1}$. A preferred example thereof is shown below.

$$\begin{bmatrix} b_{11} & b_{12} & b_{13} \\ b_{21} & b_{22} & b_{23} \\ b_{31} & b_{32} & b_{33} \end{bmatrix} = \begin{bmatrix} -1 & -0 & 0 \\ -8.5 \times 10^{-3} & -1 & 0 \\ -1.69 \times 10^{-2} & -0.1 & 1 \end{bmatrix}$$

$\beta_R = \beta_G = \beta_B = 0$

The light amount signal $V_i'$ after matrix calculation is converted logarithmically at the logarithmic converters 44, 45 and 46 into the measured density $D_i$. This measured density $D_i$ is subjected to the matrix calculation by the equation (1) at the matrix calculation unit 34 in the similar manner as the first embodiment, so as to calculate the filter setting position $FP_j$. It is noted that the measured density for obtaining the matrix elements $a_{11}$ to $a_{33}$, and $\delta_R$, $\delta_G$ and $\delta_B$ of the equation (1) through regression analysis are the same measured densities after the calculation by the equation (2) for cancelling the sensitivity crosstalk of light receiving elements. Next, the position of each color correction filter is adjusted by the driver 15 in accordance with the obtained $FP_j$.

As described above, prior to performing the logarithmic conversion of the measured light value $V_i$, that value $V_i$ is subjected to matrix conversion to cancel the sensitivity crosstalk of light receiving devices, and thereafter, the results are logarithmically converted. The obtained measured density $D_i$ is used to calculate the filter setting position in a manner similar to that of the first embodiment. Accordingly, it is possible to reduce both the photometry error caused by the sensitivity crosstalk of the light receiving devices 40 to 42 and the photometry error caused by unwanted absorption of the color correction filters.

Figure 4:
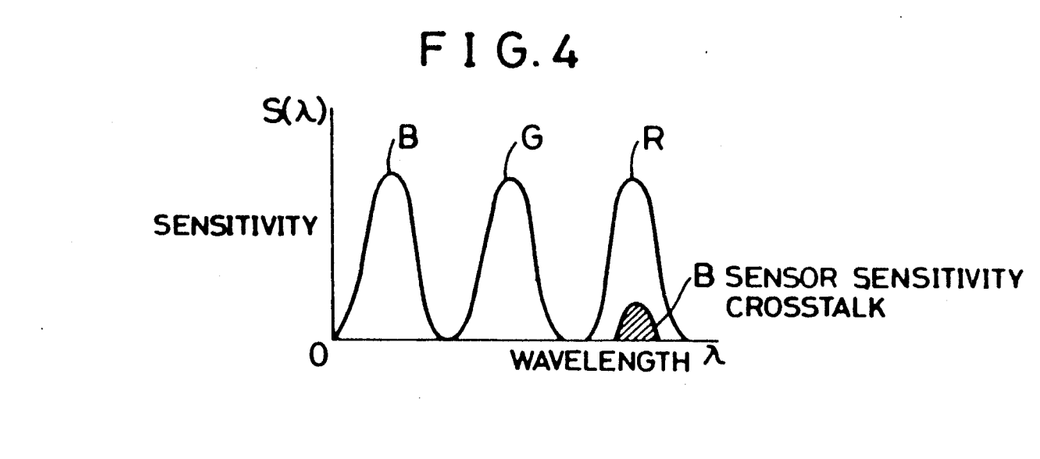
FIG. 4 is a graph showing an example of the spectral sensitivity of light receiving devices.
Figure 5:
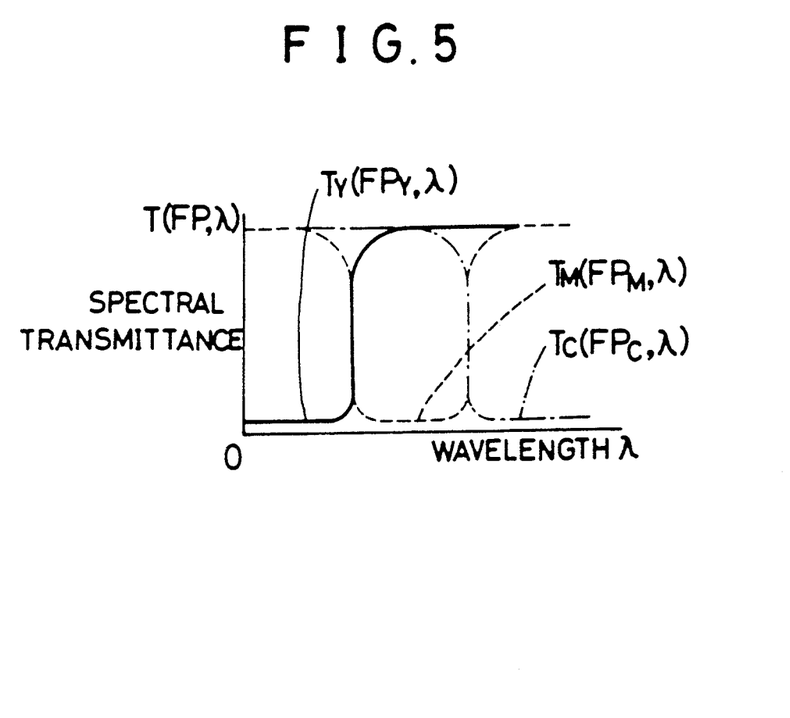
FIG. 5 is a graph showing an example of the spectral transmittance of color correction filters.
Figure 6:
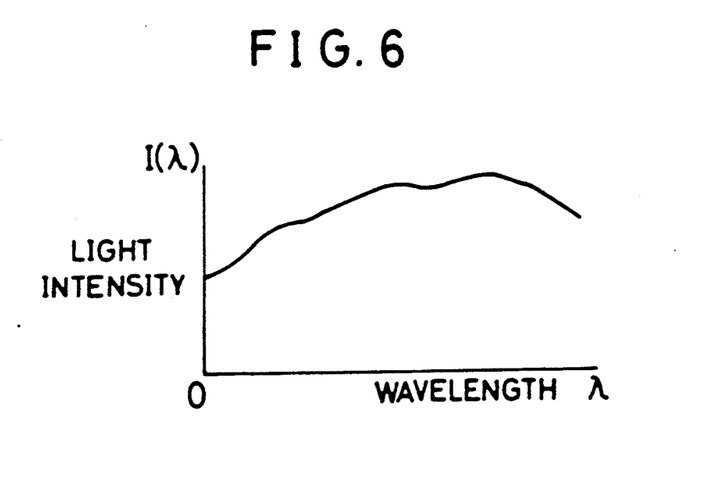
FIG. 6 is a graph showing an example of the intensity distribution of an incident light.

Next, the principle of reducing the photometry error caused by the sensitivity crosstalk of light receiving devices will be described. As shown in FIG. 4, for example, among the light receiving devices for the three color separation and photometry for an image frame to be printed, the blue color light receiving device (B sensor) has a sensitivity also for red. The output $V_B$ of the blue color light receiving device affected by the cyan filter therefore is given by:

$$V_B = \int_{\lambda_a}^{\lambda_b} S_B(\lambda) \cdot I(\lambda) \cdot T_Y(FP_Y, \lambda) \cdot T_C(FP_C, \lambda) d\lambda \quad (3)$$

where FP is a filter setting position, $\lambda$ is a wavelength, $S(\lambda)$ is a spectral sensitivity of the light receiving device (see FIG. 4), $T(FP, \lambda)$ is an effective spectral transmittance at the filter setting position (see FIG. 5), and $I(\lambda)$ is the intensity distribution of an incident light without a filter (see FIG. 6).

It is assumed that the color correction filter has a rectangular frequency characteristic, i.e. sharp cut-off characteristic with small ripple, and that the attenuation of an incident light in the filter base is zero. Then, the output $V_B$ given by the equation (3) is written as:

$$V_B = \int_{\lambda_a}^{\lambda_c} S_B(\lambda) \cdot I(\lambda) \cdot T_Y(FP_Y) d\lambda + \int_{\lambda_c}^{\lambda_b} S_B(\lambda) \cdot I(\lambda) \cdot T_C(FP_C, \lambda) d\lambda \quad (4)$$

Expressing the integration portions of the equation (4) as $V_B1$ and $V_B2$, respectively, the following equation (5) is obtained:

$$V_B = T_Y(FP_Y) \cdot V_B1 + T_C(FP_C) \cdot V_B2 \ldots \quad (5)$$

By logarithmically converting $V_B$ into the measured density (gain value) $D_B$, the following equation (6) is given:

$$D_B = \log[T_Y(FP_Y) \cdot V_B1 + T_C(FP_C) \cdot V_B2] \ldots \quad (6)$$

The following fact will be understood from the above equation: The output V of a light receiving device is a sum of an object color and another color having sensitivity crosstalk. In other words, the smaller the gain of an object color the larger the effect of sensitivity crosstalk. It is noted that the equation (6) does not conform to the following, in which light receiving device outputs are added after logarithmic conversion:

$$D_B = a \cdot \log V_B + b \cdot \log V_G + c \cdot \log V_R$$

Accordingly, photometry error caused by sensitivity crosstalk of a light receiving device cannot be expected to diminish if the light amount after logarithmic conversion is subjected to the $3 \times 3$ matrix calculation. Consequently, the output value from the light receiving device prior to logarithmic conversion is subjected to the $3 \times 3$ matrix calculation, to suppress effectively the influence by the sensitivity crosstalk.

Figure 7:
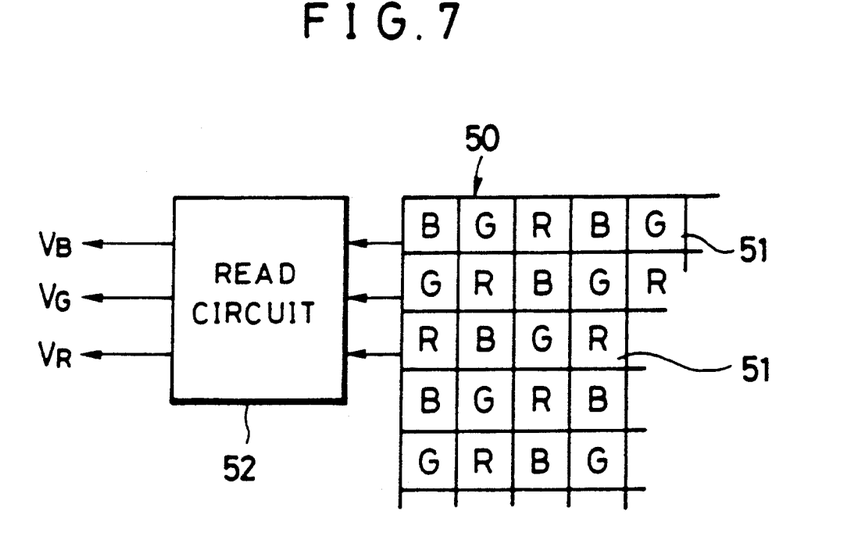
FIG. 7 is a schematic diagram showing an image area sensor.

In the above embodiments, three color light receiving devices have been used for the photometry of an image frame to be printed. In place of the three light receiving devices, an image area sensor 50 as shown in FIG. 7 may be used. Filters for transmitting red, blue or green colors are mounted on respective pixels 51 of the image sensor 50. In FIG. 7, R, B and G represent red, blue and green pixels. Signals from the image area sensor 50 are read by a read circuit 52 for each of three colors, and are inputted to the matrix calculation unit 43 to cancel the sensitivity crosstalk.

Figure 8:
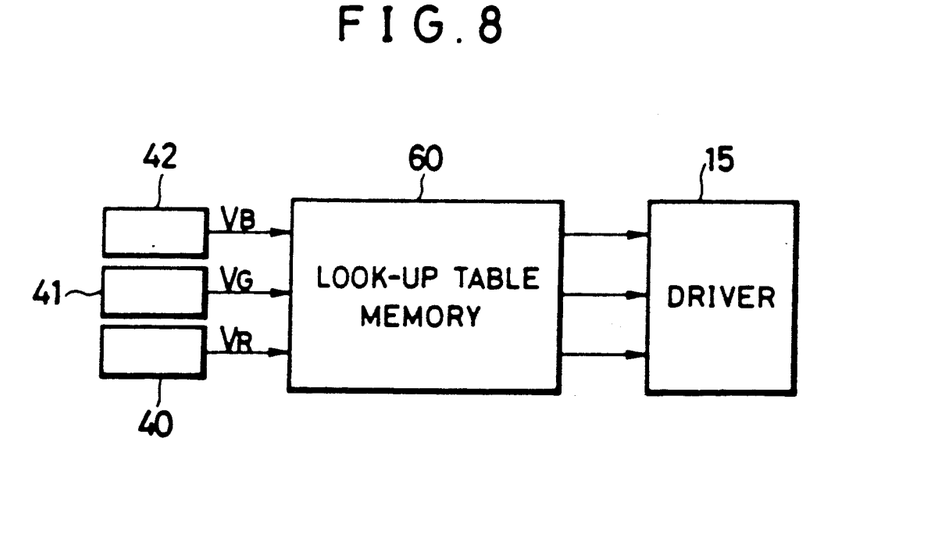
FIG. 8 is a block diagram showing an embodiment using a look-up table memory.

In the embodiment shown in FIG. 3, the measured light values $V_R$, $V_G$ and $V_B$ of the light receiving devices 40 to 42 are converted into the filter setting positions $FP_C$, $FP_M$ and $FP_Y$ by using the matrix calculation circuit 43, logarithmic converters 44 to 46 and matrix calculation circuit 34. Such arrangement requires a long calculation time. Therefore, it is convenient to use a look-up table as shown in FIG. 8. In this embodiment, a series of calculations for each measured light amount are executed beforehand to obtain table data representative of the relationship between the measured light amount and corresponding filter setting position, and the table data are stored in a look-up table memory 60. With this arrangement, the filter setting position can be obtained directly from the measured light amount. It is apparent that in the embodiment shown in FIG. 1, the calculation results from the matrix calculation circuit 34 and the calculation results from the logarithmic converters 31 to 33 and matrix calculation circuit 34 are written in the look-up table 60.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. An exposure control method for a photographic printer which has yellow, magenta and cyan color correction filters between a light source and a negative film, wherein the insertion quantity of each color correction filter into a printing optical path is controlled by adjusting the three color components of a printing light with which an image frame of the negative film is printed on a color paper, said method comprising the following steps:
measuring said image frame to obtain three measured light amounts, one for each of three primary colors;
logarithmically converting said three measured light amounts to obtain three measured densities, one for said each of three primary colors; and
subjecting said three measured densities to a first matrix calculation for obtaining a setting position of each of said color correction filters, said first matrix calculation determining a setting position of each of said color correction filters by considering all of said three measured densities of said three primary colors.

2. An exposure control method for a photographic printer according to claim 1, wherein said first matrix calculation is executed beforehand to obtain table data representative of a relationship between said three measured light amounts or measured densities and said filter setting positions, said table data are stored in a look-up table memory, and said filter setting position are searched directly from said look-up table by using as keys said measured light amounts or measured densities.

3. An exposure control method for a photographic printer according to claim 1, wherein said first matrix calculation is executed by using the following equation:

$$\begin{bmatrix} FP_C \\ FP_M \\ FP_Y \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} \Delta D_R + B_R \\ \Delta D_G + B_G \\ \Delta D_B + B_B \end{bmatrix} + \begin{bmatrix} \delta_R \\ \delta_G \\ \delta_B \end{bmatrix}$$

wherein $FP_C$, $FP_M$ and $FP_Y$ represent respectively said filter setting positions (where C is for cyan, M is for magenta, and Y is for yellow), $\Delta D_R$, $\Delta D_G$ and $\Delta D_B$ represent respective virtual measured density differences which are respective subtractions of a virtual density $VD_i$, obtained by converting the density ($DN_i+\Delta d_i$) into the linear area from a virtual measured density $VDN_i$ obtained by converting the measured density $DN_i$ into the linear area, where the measured density for a normal control negative film is represented by $DN_i$ (i representing one of red, green and blue), the measured density of said image frame to be printed is represented by $D_i$, and the density difference ($DN_i - D_i$) is represented by $\Delta d_i$.

$a_{11}$ to $a_{33}$ represent matrix elements (coefficients) of said matrix calculation, $B_R$, $B_G$ and $B_B$ represent the virtual measured densities corresponding to the filter setting positions for a properly finished normal control negative film, and $\delta_R$, $\delta_G$ and $\delta_B$ represent matrix elements (correction constants) of said matrix calculation.

4. An exposure control method for a photographic printer according to claim 3, wherein said first matrix calculation is executed beforehand to obtain table data representative of a relationship between said measured light amounts or measured densities and said filter setting positions, said table data are stored in a look-up table memory, and said filter setting positions are searched directly from said look-up table by using as keys said measured light amounts or measured densities.

5. An exposure control method for a photographic printer according to claim 3, wherein said coefficients $a_{11}$ to $a_{33}$ each take a value of 1 to 1.5 for a color for which said filter setting position is obtained, and a value of $\pm 1 \times 10^{-4}$ to $\pm 2 \times 10^{-1}$ for the two colors other than said color, and said elements $\delta_R$, $\delta_G$ and $\delta_B$ of a matrix each take a value of 0 to $\pm 2 \times 10^{-1}$.

6. An exposure control method for a photographic printer according to claim 3, wherein said measured light amount of each of three primary colors is detected with a color image area sensor.

7. An exposure control method for a photographic printer according to claim 3, wherein said red, green and blue measured light amounts are measured with red, green and blue light receiving devices, respectively.

8. An exposure control method for a photographic printer according to claim 7, wherein said measured light amount for the color obtained by each of said light receiving devices is subjected to a further matrix calculation to cancel sensitivity crosstalk of said light receiving devices.

9. An exposure control method for a photographic printer according to claim 3, wherein said measured light amounts of said three primary colors are obtained by using said red, green and blue light receiving devices, subjected to the following second matrix calculation to cancel the sensitivity crosstalk of said light receiving devices, and the corrected amounts of said measured light amounts are converted logarithmically to obtain said measured density:

$$\begin{bmatrix} V_R' \\ V_G' \\ V_B' \end{bmatrix} = \begin{bmatrix} b_{11} & b_{12} & b_{13} \\ b_{21} & b_{22} & b_{23} \\ b_{31} & b_{32} & b_{33} \end{bmatrix} \times \begin{bmatrix} V_R \\ V_G \\ V_B \end{bmatrix} + \begin{bmatrix} \beta_R \\ \beta_G \\ \beta_B \end{bmatrix}$$

wherein:

$V_R$, $V_G$ and $V_B$ represent the measured light values of said three primary colors, $V_R'$, $V_G'$ and $V_B'$ represent the measured light values of said matrix calculation, and $b_{11}$ to $b_{33}$, $\beta_G$ and $\beta_B$ represent matrix elements in said matrix calculation.

10. An exposure control method for a photographic printer according to claim 9, wherein said coefficients $b_{11}$ to $b_{33}$ of the matrix each take a value 1 for one of the primary colors to be calculated, and a value of $\pm 1 \times 10^{-4}$ to $\pm 2 \times 10^{-1}$ for the two primary colors other than said primary color, and the correction constants $\beta_R$, $\beta_G$ and $\beta_B$ each take a value of 0 to $\pm 2 \times 10^{-1}$.

11. An exposure control method for a photographic printer according to claim 10, wherein said first and second matrix calculations are executed beforehand to obtain table data representative of a relationship between said measured light amount and said filter setting position, the table data are stored in a look-up table memory, and said filter setting position is directly searched from said look-up table by using as a key said measured light amount.

* * * * *